W. L. WALTON.
WHEEL LIFT.
APPLICATION FILED DEC. 24, 1913.
1,340,587.
Patented May 18, 1920.
2 SHEETS—SHEET 1.
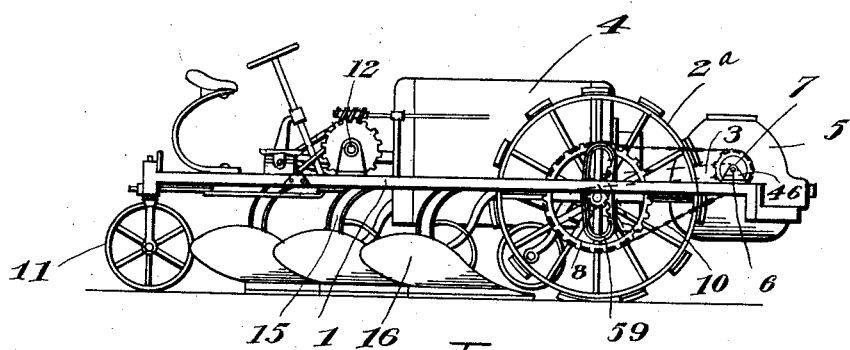
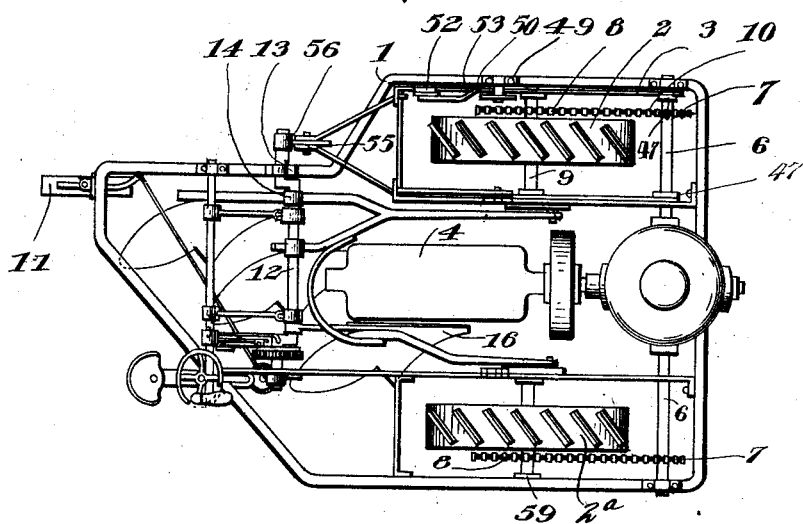
WITNESSES
INVENTOR
W. L. WALTON
BY
ATT'Y.

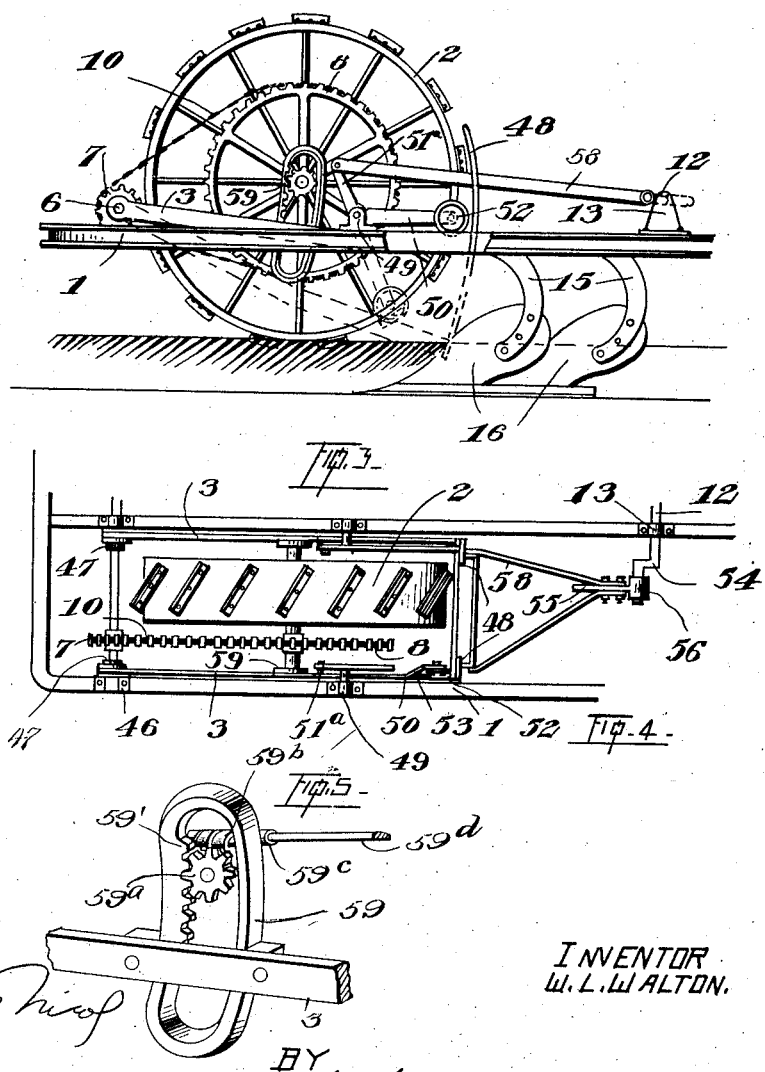

UNITED STATES PATENT OFFICE.

WILLIAM L. WALTON, OF BANTRY, NORTH DAKOTA.

WHEEL-LIFT.

1,340,587.     Specification of Letters Patent.     Patented May 18, 1920.

Original application filed June 12, 1912, Serial No. 703,239. Divided and this application filed December 24, 1913. Serial No. 808,620.

*To all whom it may concern:*

Be it known that I, WILLIAM L. WALTON, a citizen of the United State of America, and resident of Bantry, State of North Dakota, in the United States of America, have invented certain new and useful Improvements in Wheel-Lifts, of which the following is the specification.

This invention relates to improvements in wheel lifts, such for example as are used in motor plows and particularly to the wheel lift adapted to be used in the plow which I have shown in my copending application Serial No. 703,239, filed June 12th, 1912. General objects of the inventon are to provide improved mechanism for bringing the wheels to the same level during the turning of the plow, or otherwise when the plows are inoperative. Further objects are to enable the operation to be carried out at the same time as the operation of the plow lift mechanism and practically by the same mechanism. The invention consists of the improved construction hereinafter described in detail in the accompanying specification and drawings.

Figure 1 is a side elevation of the machine.

Fig. 2 is a plan view thereof.

Fig. 3 is a side elevation of a portion of the mechanism.

Fig. 4 is a plan view.

Fig. 5 is a perspective view of the device for adjusting the position of the traction wheel.

In the drawings like characters of reference indicate corresponding parts in each figure.

1 is the main frame. 2 and 2ª are the traction wheels, the former being journaled to the subframe 3. 4 is a power plant and 5 transmission gear and 6 the counter shaft extending crosswise of the frame having sprockets 7 thereon. 8 are sprockets on the traction wheel axles. 10 are chains connecting the sprockets 7 and 8. 11 is the rear guiding wheel suitably pivoted to the main frame. 12 is the crank shaft extending crosswise of the frame having bearings 13 thereon. 14 are boxes surrounding the crank shaft and connected to the beams 15 of the plows 16.

The crank shaft is operated and controlled by suitable mechanism such as that described in my application 703239. The plows are lifted by suitable mechanism such for example, as that shown and described in my application Serial No. 808619, filed Dec. 24, 1913.

The sub-frame 3 is in the form of a U-shaped yoke having its ends pivotally mounted on the counter-shaft 6 and being retained in position by collars 47 on the counter-shaft. The counter-shaft itself is supported by suitable bearing boxes 46. This arrangement allows the lowering and raising of the rear end of the sub-frame 3 and traction wheel 2 without disturbing the tightness of the driving chain 10. Guide pieces 48 are attached to the rear end of the sub-frame and are intended to hold the sub-frame in line between the main frame bars when the former is raised and lowered within the main frame. 49 are brackets and 50 are bell crank levers pivotally connected thereto. The rear ends of the bell crank levers 50 are provided with rollers 52 having flanges on their inner edges, and the bell cranks are offset at 53 so that the outsides of the rollers will pass between the main frame bars. The rollers 52 rests upon the sub-frame 3 near its rear end and when the sub-frame is in its most elevated position it rests firmly against the bell cranks directly below the pivots of the brackets 49.

An additional crank 54 is formed on the end of the crank shaft 12, this crank being set at approximately right angles to the plow lift crank throw of the same. A plate 55 having a hollow boss 56 at its rear end is designed to be pivotally secured to the crank 54. 58 are connecting bars having their rear ends secured at each side of the plate 55 and their forward ends pivotally connected to the upper ends 51ª of the bell crank levers.

To provide for the manual independent adjustment of the traction wheel 2, racks 59 are provided having teeth 59' on one side of the inside. Each rack 59 is connected to the sub-frame 3, and is engaged by a pinion 59ª fixedly mounted on the shaft supporting the traction wheel and adapted to be turned manually by suitable means such as the worm gear 59ᵇ connected thereto, and the worm 59ᶜ which may be turned by a suitable shaft 59ᵈ. It may be stated that this adjustment mechanism is by itself well known but its use on the sub-frame 3 with the power lift mechanism is new with the applicant. When the end of the field is reached and the plows are to be thrown out by the lifting device, a half turn of the crank shaft 12 will throw the crank 54 into rearward position, pulling the top end of the bell cranks 51ª backwardly as shown in the dotted lines in Fig. 3, thus throwing the rear end of the sub-frame 3 downwardly, carrying the left traction wheel 2 down to the level of the right traction wheel, as in the movement of the raising and lowering device. When the turn at the end of the field has been made, the other half revolution will allow the sub-frame 3 to return to its normal position between the main frame bars.

It will be understood that the sub-frame 3 is only applied to the left hand or land wheel 2, the right hand or furrow wheel rack bars are bolted solidly to the frame.

From the above description it will be seen that the advantages of the raising and lowering will be great.

What I claim as my invention is:

1. In a traction device, a main frame, a sub-frame, a traction wheel journaled in the sub-frame, a traction wheel journaled in the main frame, a suitable engine mounted on the main frame, a transmission gear connected thereto, a counter shaft connected to the transmission gear and having bearings on the main frame, suitable driving connections between the countershaft and the wheels, racks secured to the sub-frame, pinions on the axle of the traction wheel meshing with the racks, said sub-frame being pivotally connected at its forward end to the counter shaft, and means for lowering and raising the rear end of the sub-frame, as and for the purpose specified.

2. In a plow, a main frame, a sub-frame, a traction wheel journaled in the sub-frame, a suitable engine mounted on the main frame, a transmission gear connected thereto, a counter shaft connected to the transmission gear and having bearings on the main frame, a wheel rack secured to the sub-frame, a pinion on the axle of the traction wheel meshing with the rack, said sub-frame being pivotally connected at its forward end to the counter shaft, a crank shaft, an additional crank formed on the end of the crank shaft, a plate having a hollow boss on its rear end pivotally connected to the additional crank, a bracket on the side bar of the main frame, a bell crank lever pivotally connected thereto, the lower end of the bell crank having a roller mounted thereon with flanges on its inner edge, said roller running on the sub-frame side bar, and a connecting bar adjustably connected at one end to the plate pivoted to the additional crank and at the other end to the upper end of the bell crank lever, as and for the purpose specified.

3. In a plow, a main frame, a sub-frame, a traction wheel journaled to the sub-frame, a traction wheel journaled to the main frame, a suitable engine mounted on the main frame, a transmission gear connected thereto, a counter shaft connected to the transmission gear and having bearings on the main frame, suitable driving connections between the countershaft and the wheels, a rack secured to the sub-frame, a pinion on the axle of the traction wheel meshing with the rack, a crank shaft, said sub-frame being pivotally connected at its forward end to the counter shaft, an additional crank on the crank shaft, a plate having a hollow boss on its rear end pivotally connected to the crank, a bracket on the side bar of the main frame, a bell crank lever pivotally connected thereto, the lower end of the bell crank having a roller mounted thereon with a flange on its inner edge, said roller running on the sub-frame side bar, and a connecting bar adjustably connected at one end to the plate pivoted to the crank and the other end to the upper end of the bell crank lever, as and for the purpose specified.

4. In a traction device, a frame, a traction wheel mounted therein, an independently adjustable sub-frame, a traction wheel on the sub-frame, and power means for moving the sub-frame to bring the traction wheels to the same level, and means for manually adjusting the position of the traction wheel on the sub-frame.

5. In a traction device, a frame, a traction wheel mounted therein, an independently adjustable sub-frame, a traction wheel on the sub-frame, and power means for moving the sub-frame to bring the traction wheels to the same level, said means including a crank shaft and bell cranks operated by one half throw of the crank to throw the traction wheel full up or full down.

In witness whereof I have hereunto set my hand in the presence of two witnesses.

WILLIAM L. WALTON.

Witnesses:
H. M. WALTON,
NELS MELAAS.